US010902047B2

(12) United States Patent
Hayakawa

(10) Patent No.: US 10,902,047 B2
(45) Date of Patent: Jan. 26, 2021

(54) INFORMATION PROCESSING METHOD FOR DISPLAYING A PLURALITY OF IMAGES EXTRACTED FROM A MOVING IMAGE

(71) Applicant: CANON KABUSHIKI KAISHA, Tokyo (JP)

(72) Inventor: Mizuki Hayakawa, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/144,498

(22) Filed: Sep. 27, 2018

(65) Prior Publication Data
US 2019/0102398 A1    Apr. 4, 2019

(30) Foreign Application Priority Data
Oct. 3, 2017    (JP) .................. 2017-193785

(51) Int. Cl.
| G06F 16/40 | (2019.01) |
| G06F 16/438 | (2019.01) |
| G06F 7/36 | (2006.01) |
| G06T 7/215 | (2017.01) |
| G06F 16/48 | (2019.01) |
| H04N 1/387 | (2006.01) |

(Continued)

(52) U.S. Cl.
CPC ............ *G06F 16/4393* (2019.01); *G06F 7/36* (2013.01); *G06F 16/40* (2019.01); *G06F 16/489* (2019.01); *G06F 16/50* (2019.01); *G06T 7/215* (2017.01); *G11B 27/031* (2013.01); *H04N 1/3873* (2013.01)

(58) Field of Classification Search
CPC ................... G06F 16/40; G06F 16/50
See application file for complete search history.

(56) References Cited

U.S. PATENT DOCUMENTS

| 5,537,528 A | * | 7/1996 | Takahashi | ............ | G11B 27/034 |
| | | | | | 715/255 |
| 6,741,977 B1 | * | 5/2004 | Nagaya | ................. | H04N 5/765 |

(Continued)

FOREIGN PATENT DOCUMENTS

JP    2005-150923 A    6/2005

OTHER PUBLICATIONS

Yeung et al., "Video Visualization for Compact Presentation and Fast Browsing of Pictorial Content," IEEE Transactions on Circuits and Systems for Video Technology, vol. 7, No. 5, Oct. 1997, p. 771-785. (Year: 1997).*

(Continued)

*Primary Examiner* — Amelia L Tapp
(74) *Attorney, Agent, or Firm* — Canon U.S.A., Inc. IP Division

(57) ABSTRACT

First time information individually corresponding to a plurality of first images extracted from a designated moving image is assigned to the plurality of first images. The plurality of first images and a second image captured as a still image are individually displayed such that the plurality of first images are consecutively arranged irrespective of the first time information and second time information corresponding to the second image and the plurality of first images and the second image are arranged in order based on time information corresponding to the designated moving image and the second time information.

14 Claims, 13 Drawing Sheets

| FILE NAME | IMAGING DATE AND TIME | ID |
|---|---|---|---|
| 3001 | IMG000.jpg | 09/01/2017 11:23:40 | |
| 3002 | IMG001.jpg | 09/01/2017 11:23:44 | |
| 4031 | MOV001_1.jpg | 09/01/2017 11:23:45 | 0001 |
| 3004 | IMG002.jpg | 09/01/2017 11:23:46 | |
| 4032 | MOV001_2.jpg | 09/01/2017 11:23:47 | 0001 |
| 3005 | IMG003.jpg | 09/01/2017 11:23:48 | |
| 4033 | MOV001_3.jpg | 09/01/2017 11:23:49 | 0001 |
| 3006 | IMG004.jpg | 09/01/2017 11:23:50 | |
| 4034 | MOV001_4.jpg | 09/01/2017 11:23:51 | 0001 |
| 3008 | IMG005.jpg | 09/01/2017 11:25:08 | |
| 4071 | VD0001_1.jpg | 09/01/2017 11:25:10 | 0002 |
| 3009 | IMG006.jpg | 09/01/2017 11:25:15 | |
| 4072 | VD0001_2.jpg | 09/01/2017 11:25:20 | 0002 |
| 3010 | IMG007.jpg | 09/01/2017 11:25:30 | |

(51) Int. Cl.
*G11B 27/031* (2006.01)
*G06F 16/50* (2019.01)

(56) References Cited

U.S. PATENT DOCUMENTS

| | | | | |
|---|---|---|---|---|
| 2002/0180803 | A1* | 12/2002 | Kaplan | H04L 29/06027 |
| | | | | 715/810 |
| 2005/0044091 | A1* | 2/2005 | Nakamura | G06F 16/40 |
| 2006/0244847 | A1* | 11/2006 | Nagaoka | G11B 27/034 |
| | | | | 348/231.99 |
| 2007/0201832 | A1* | 8/2007 | Date | G11B 27/034 |
| | | | | 386/230 |
| 2008/0151317 | A1* | 6/2008 | Imine | H04N 1/32053 |
| | | | | 358/403 |
| 2009/0245643 | A1 | 10/2009 | Hasegawa | |
| 2009/0249200 | A1* | 10/2009 | Hasegawa | H04N 1/32117 |
| | | | | 715/273 |
| 2011/0242336 | A1 | 10/2011 | Yamaji | |
| 2012/0020648 | A1 | 1/2012 | Yamaji | |
| 2016/0260460 | A1 | 9/2016 | Abe | |
| 2017/0099431 | A1* | 4/2017 | Harada | G11B 27/00 |

OTHER PUBLICATIONS

Bursuc et al., "Detection of Multiple Instances of Video Objects," 2011 Seventh International Conference on Signal Image Technology & Internet-Based Systems, copyright 2011 IEEE, p. 446-453. (Year: 2011).*

* cited by examiner

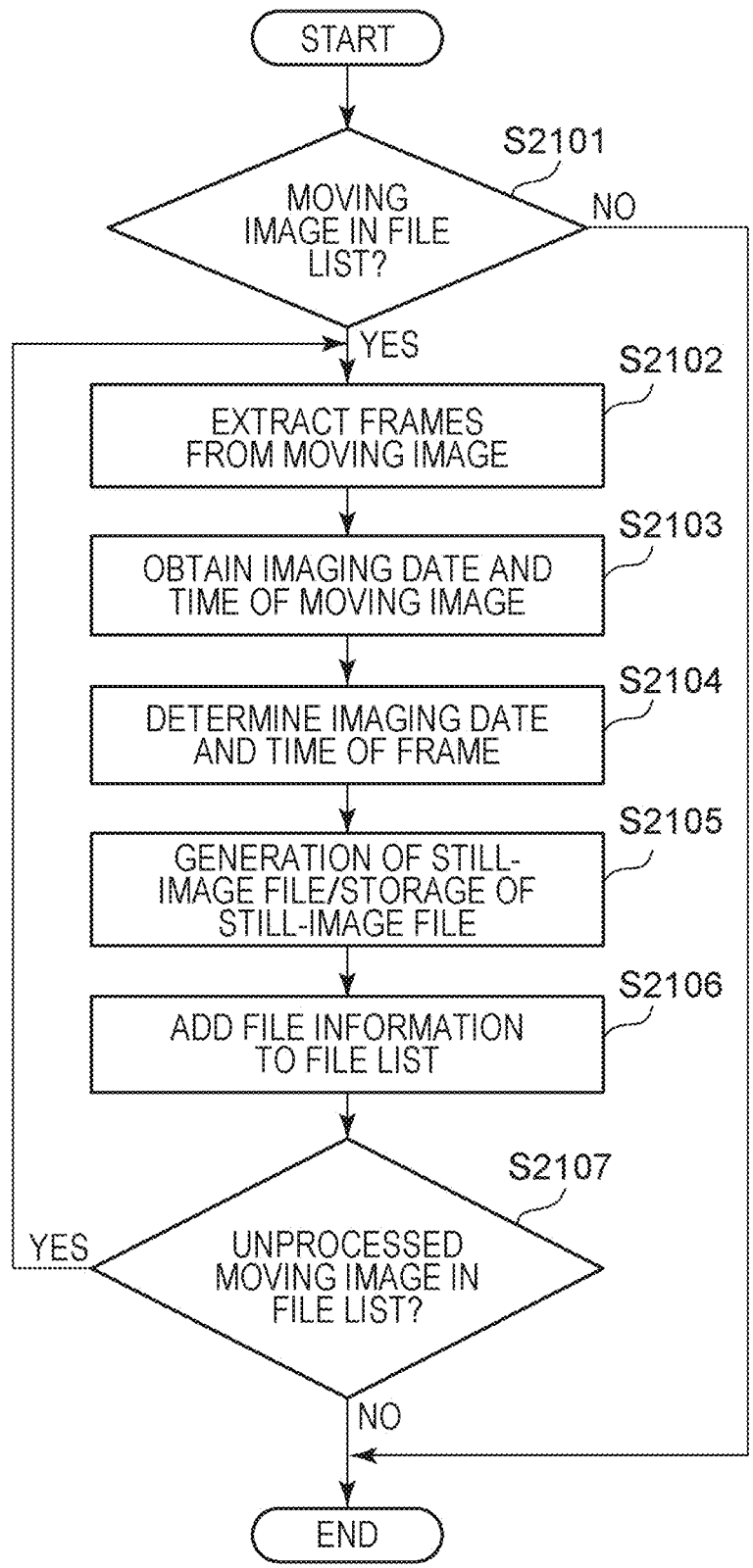

FIG. 3

| | FILE NAME | IMAGING DATE AND TIME | ID |
|---|---|---|---|
| 3001 | IMG000.jpg | 09/01/2017 11:23:40 | |
| 3002 | IMG001.jpg | 09/01/2017 11:23:44 | |
| 3003 | MOV001.mov | | |
| 3004 | IMG002.jpg | 09/01/2017 11:23:46 | |
| 3005 | IMG003.jpg | 09/01/2017 11:23:48 | |
| 3006 | IMG004.jpg | 09/01/2017 11:23:50 | |
| 3007 | VD0001.mov | | |
| 3008 | IMG005.jpg | 09/01/2017 11:25:10 | |
| 3009 | IMG006.jpg | 09/01/2017 11:25:20 | |
| 3010 | IMG007.jpg | 09/01/2017 11:25:30 | |

FIG. 4

| | FILE NAME | IMAGING DATE AND TIME | ID |
|---|---|---|---|
| 3001 | IMG000.jpg | 09/01/2017 11:23:40 | |
| 3002 | IMG001.jpg | 09/01/2017 11:23:44 | |
| 3004 | IMG002.jpg | 09/01/2017 11:23:46 | |
| 3005 | IMG003.jpg | 09/01/2017 11:23:48 | |
| 3006 | IMG004.jpg | 09/01/2017 11:23:50 | |
| 3008 | IMG005.jpg | 09/01/2017 11:25:08 | |
| 3009 | IMG006.jpg | 09/01/2017 11:25:15 | |
| 3010 | IMG007.jpg | 09/01/2017 11:25:30 | |
| 4031 | MOV001_1.jpg | 09/01/2017 11:23:45 | 0001 |
| 4032 | MOV001_2.jpg | 09/01/2017 11:23:47 | 0001 |
| 4033 | MOV001_3.jpg | 09/01/2017 11:23:49 | 0001 |
| 4034 | MOV001_4.jpg | 09/01/2017 11:23:51 | 0001 |
| 4071 | VD0001_1.jpg | 09/01/2017 11:25:10 | 0002 |
| 4072 | VD0001_2.jpg | 09/01/2017 11:23:20 | 0002 |

FIG. 5

| | FILE NAME | IMAGING DATE AND TIME | ID |
|---|---|---|---|
| 3001 | IMG000.jpg | 09/01/2017 11:23:40 | |
| 3002 | IMG001.jpg | 09/01/2017 11:23:44 | |
| 4031 | MOV001_1.jpg | 09/01/2017 11:23:45 | 0001 |
| 3004 | IMG002.jpg | 09/01/2017 11:23:46 | |
| 4032 | MOV001_2.jpg | 09/01/2017 11:23:47 | 0001 |
| 3005 | IMG003.jpg | 09/01/2017 11:23:48 | |
| 4033 | MOV001_3.jpg | 09/01/2017 11:23:49 | 0001 |
| 3006 | IMG004.jpg | 09/01/2017 11:23:50 | |
| 4034 | MOV001_4.jpg | 09/01/2017 11:23:51 | 0001 |
| 3008 | IMG005.jpg | 09/01/2017 11:25:08 | |
| 4071 | VD0001_1.jpg | 09/01/2017 11:25:10 | 0002 |
| 3009 | IMG006.jpg | 09/01/2017 11:25:15 | |
| 4072 | VD0001_2.jpg | 09/01/2017 11:23:20 | 0002 |
| 3010 | IMG007.jpg | 09/01/2017 11:25:30 | |

FIG. 6

| | FILE NAME | IMAGING DATE AND TIME | ID |
|---|---|---|---|
| 3001 | IMG000.jpg | 09/01/2017 11:23:40 | |
| 3002 | IMG001.jpg | 09/01/2017 11:23:44 | |
| 4031 | MOV001_1.jpg | 09/01/2017 11:23:45 | 0001 |
| 3004 | IMG002.jpg | 09/01/2017 11:23:46 | |
| | | | |
| 3005 | IMG003.jpg | 09/01/2017 11:23:48 | |
| | | | |
| 3006 | IMG004.jpg | 09/01/2017 11:23:50 | |
| | | | |
| 3008 | IMG005.jpg | 09/01/2017 11:25:08 | |
| 4071 | VD0001_1.jpg | 09/01/2017 11:25:10 | 0002 |
| 3009 | IMG006.jpg | 09/01/2017 11:25:15 | |
| 4072 | VD0001_2.jpg | 09/01/2017 11:23:20 | 0002 |
| 3010 | IMG007.jpg | 09/01/2017 11:25:30 | |

INFORMATION PROCESSING METHOD FOR DISPLAYING A PLURALITY OF IMAGES EXTRACTED FROM A MOVING IMAGE

BACKGROUND OF THE INVENTION

Field of the Invention

The present disclosure relates to an information processing method for displaying a plurality of images in a display apparatus, an information processing apparatus, and a storage medium.

Description of the Related Art

In general, digital still cameras and the like may have a function of shooting a moving image in addition to a function of capturing a still image.

Japanese Patent Laid-Open No. 2005-150923 discloses extraction of a plurality of frames from a moving image. Furthermore, a value calculated using a shooting date and time and a reproduction time of a moving image is written as a shooting date and time in a still image file generated by a frame extracted from a moving image.

A plurality of images extracted from a moving image and an image captured as a still image may be displayed in predetermined order.

In a case where a shooting date and time is written for a frame as described in Japanese Patent Laid-Open No. 2005-150923, if a shooting date and time of a still image is included in a shooting period of the moving image, order according to a shooting date and time may be a frame A, a still image, and a frame B. Therefore, if these images are displayed in order according to a shooting date and time, the still image is displayed between the frames A and B although the frames A and B are extracted from the same moving image. In particular, if the still image is captured in an imaging scene which is different from that of the moving image, a result of display which is not desired by a user may be obtained.

SUMMARY OF THE INVENTION

The present disclosure provides a program, an information processing apparatus, and an information processing method which appropriately display a plurality of images including images extracted from a moving image.

According to an aspect of the present disclosure, an information processing method for displaying a plurality of first images which correspond to a plurality of frames included in a designated moving image and which are extracted from the designated moving image and a second image captured as a still image includes assigning first time information individually corresponding to the plurality of first images to the plurality of first images based on time information corresponding to the designated moving image, and individually displaying the plurality of first images and the second image in order based on the time information corresponding the designated moving image and second time information corresponding to the second image. In the displaying, the plurality of first images and the second image are individually displayed such that the plurality of first images are consecutively arranged irrespective of the assigned first time information and the second time information and the plurality of first images and the second image are arranged in order based on the time information corresponding to the designated moving image and the second time information.

Further features of the present invention will become apparent from the following description of exemplary embodiments with reference to the attached drawings.

BRIEF OF DESCRIPTION OF THE DRAWINGS

FIGS. 2A and 2B are flowcharts of an example of a display control process performed by the information processing apparatus.

FIG. 3 is a diagram illustrating an example of file information.

FIG. 4 is a diagram illustrating internal data obtained after a process of extracting images from a moving image.

FIG. 5 is a diagram illustrating the internal data after sorting.

FIG. 6 is a diagram illustrating the internal data after data rows are deleted.

DESCRIPTION OF THE EMBODIMENTS

First Embodiment

Figure 1:
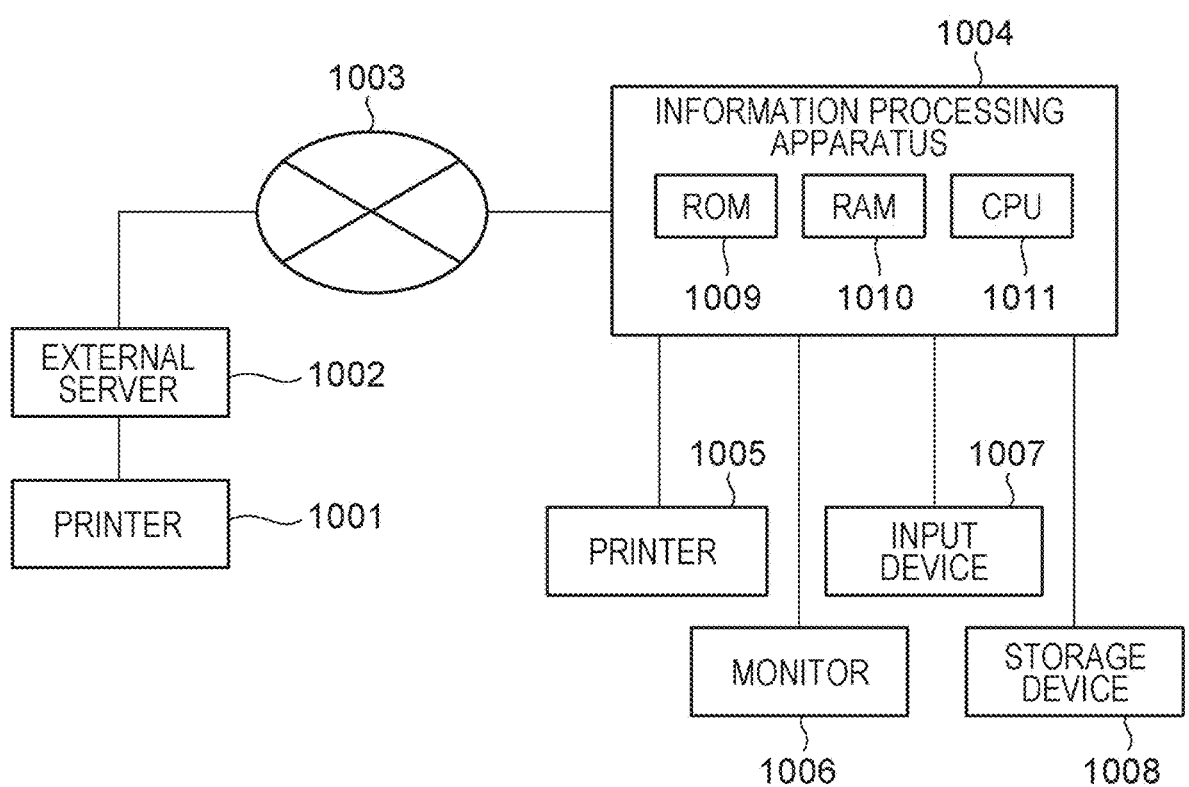
FIG. 1 is a diagram illustrating a configuration of an information processing apparatus.

First, a configuration of an information processing apparatus according to a first embodiment will be described. FIG. 1 is a diagram illustrating a configuration of an information processing apparatus 1004. The information processing apparatus 1004 is capable of generating an album (a photo album and a photo book) using input image data, outputting the generated album as print data, and uploading the generated album to an external server. The information processing apparatus 1004 includes a ROM 1009, a RAM 1010, and a CPU 1011. The information processing apparatus 1004 further includes a printer 1005, a monitor 1006, an input device 1007, a storage device 1008, and an input/output interface (not illustrated) which connects the information processing apparatus 1004 to a network 1003.

The CPU 1011 is a central processing unit which controls the entire information processing apparatus 1004 by executing an operation system program (hereinafter referred to as an "OS") stored in the storage device 1008 or the ROM 1009 using the RAM 1010 as a work memory. Furthermore, the CPU 1011 executes various programs stored in the ROM 1009 and the RAM 1010 so as to realize various functional configurations of the information processing apparatus 1004 and calculation and processing of information, and controls hardware. The ROM 1009 is a read-only memory and stores various programs. The RAM 1010 is a random access memory which functions as a work memory for the CPU 1011, and in a case of a nonvolatile RAM, the RAM 1010 stores various programs.

Figure 2A:
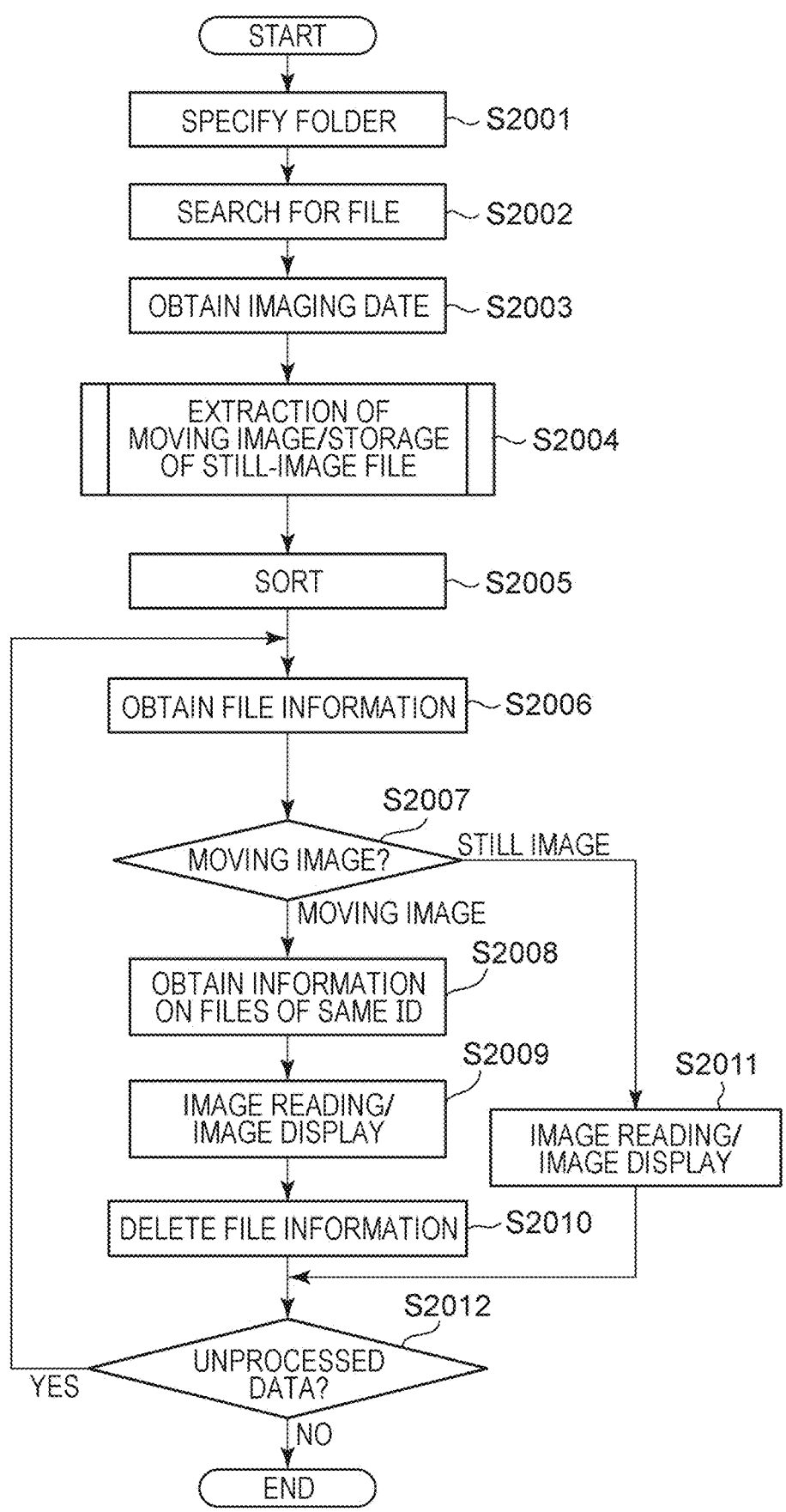

Furthermore, a program for an album creation application used to generate album data corresponding to an album is also stored in the ROM 1009 or the RAM 1010. When the CPU 1011 executes the program, a process described hereinafter with reference to FIGS. 2A and 2B is realized. Note that the album data includes image data corresponding images to be arranged in the album, image data which is templates for the arrangement of images, and layout data indicating sizes, positions, angles, and the like for the arrangement of images in the templates. Note that one template corresponds to a double-page spread of the album. The album data corresponding to the number of double-page spreads of the album is generated. However, a format of the album data is not limited to this, and image data for a double-page spread including images arranged on a template may be generated.

Furthermore, the album creation application has an album automatic creation function of automatically selecting a plurality of images in an image group stored in the storage device 1008 or the like and automatically arranging the automatically-selected images in a template so as to generate an album. Note that, in the automatic selection of images, the CPU 1011 analyzes images included in the image group using the album creation application and selects a number of the images to be arranged based on a result of the analysis. In the analysis of images, image quality and a type (a person, for example) of an object included in an image are analyzed, for example. In the automatic selection of images, a high-quality image or an image including an object specified by a user (a specific person, for example) is preferentially selected. Furthermore, the CPU 1011 executes the album creation application so as to automatically arrange a plurality of images in the album, as the album automatic creation function, in accordance with imaging date and times of the images. For example, the CPU 1011 performs image automatic layout (automatic arrangement) such that an image having a newer imaging date and time is arranged as a page number is incremented in a plurality of double-page spreads. Furthermore, the CPU 1011 may perform the image automatic layout (the automatic arrangement) such that imaging date and times of images become older toward an upper left slot and imaging date and times of images become newer toward a lower right slot in a template of one double-page spread.

Furthermore, the album creation application has a function of changing an arrangement target from an image arranged in an album created by the album automatic creation function as described above to another image, Screens illustrated in FIGS. 7, 10, and 11 described below may be displayed as screens including images of selection candidates for selecting an image to be arranged instead of an image arranged in an album created by the album automatic creation function. Alternatively, the album creation application may include a function of manually selecting an image to be arranged by the user without using the album automatic creation function. The screens illustrated in FIGS. 7, 9, 10, and 11 described below may be displayed as screens including images of selection candidates for the manual selection.

The network 1003 connected to the information processing apparatus 1004 and the external server 1002 is a communication network which performs transmission of information to and reception of information from the connected apparatuses. The external server 1002 has an input/output interface (not illustrated) for connection to the printer 1001, and the printer 1001 is connected to the external server 1002. Album data generated using the album creation application by the information processing apparatus 1004 is uploaded to the external server 1002 through the network 1003. The external server 1002 outputs the uploaded album data to the printer 1001 if the album data is printable. It is assumed that the external server 1002 is an album order entry/management server, and the user uploads album data generated by the own information processing apparatus 1004 to the external server 1002. When a required album purchase procedure is operated, the external server 1002 outputs the album data to the printer 1001 which prints the album data. Thereafter, the output print product is bound as a book and delivered to the user.

The printer 1005 prints the print product generated by the information processing apparatus 1004. For example, the user may cause the printer 1005 owned by the user to print an album generated by the information processing apparatus 1004 using the album creation application, and the user may bind a book so as to finish an album.

The monitor 1006 is a display apparatus which displays image information output from the information processing apparatus 1004. The input device 1007 includes a keyboard and a pointing device which are used to input various instructions to the information processing apparatus 1004. The input device 1007 may be integrated with a monitor as a touch panel, and in this case, the user issues an instruction by directly touching the monitor. The storage device 1008 is a hard disk drive (HDD), a solid state drive (SSD), or the like which stores image data and the templates.

Note that the information processing apparatus 1004 is a desktop personal computer (PC), and the information processing apparatus 1004, the monitor 1006, the input device 1007, and the storage device 1008 are individual devices in FIG. 1. However, the present disclosure is not limited to this, and a number of or all of the monitor 1006, the input device 1007, and the storage device 1008 (which may be common to the RAM 1010 of the information processing apparatus 1004) may be included as components in the information processing apparatus 1004. In a case where the information processing apparatus 1004 is a smartphone or a tablet device, for example, the information processing apparatus 1004 includes a touch panel constituted by integrating the monitor 1006 and the input device 1007.

Second, a process of extracting an image from a moving image and displaying the extracted image performed by the information processing apparatus 1004 will be described. FIGS. 2A and 2B are flowcharts of an example of a display control process performed by the information processing apparatus 1004. Note that program modules corresponding to various processes in FIGS. 2A and 2B are included in a program corresponding to the album creation application, and the program is stored in the ROM 1009 or the RAM 1010. Then the CPU 1011 executes the program in the RAM 1010 so that a process described with reference to FIGS. 2A and 2B is realized.

FIG. 2A is a main flowchart of the display control process performed by information processing apparatus 1004. In step S2001, the CPU 1011 specifies a folder including images to be displayed in response to an instruction issued by the user. A specific folder of hard disk in the information processing apparatus 1004 may be specified or images in an external storage medium, such as the storage device 1008, may be specified, for example. Furthermore, the external storage device may be a memory card, such as a secure digital (SD) card, which stores images captured by a digital still camera. Furthermore, the memory card may be inserted into a memory card reading apparatus (not illustrated) included in the information processing apparatus 1004 and a folder in the memory card may be specified. Furthermore, the display for specifying a folder may be executed by the OS instead of the album creation application. In this case, in step S2001, the album creation application causes the OS to display a screen for displaying information on a folder in the monitor 1006 using an application programming interface (API) included in the OS. The album creation application obtains, from the OS, information indicating the folder specified in the screen provided by the OS.

In step S2002, the CPU 1011 searches the folder specified in step S2001 for image files to be displayed and stores the image files in the RAM 1010 as internal data. As a method for searching for image files to be displayed, the album creation application obtains information on the files (file names, file paths, and the like) included in the specified folder using the API included in the OS, for example. Then the album creation application creates a file list which is a list of the file information as the internal data to be stored in the RAM 1010. The files corresponding to the file information included in the file list are candidates of display targets. Note that trailing ends of the file names obtained by the album creation application from the OS have extensions. The album creation application determines whether the file names are to be added in the file list, that is, whether the files are to be displayed, based on the extensions. Then only the file information corresponding to the file names having a predetermined extension is included in the file list and is to be displayed.

In step S2003, the information processing apparatus 1004 obtains imaging date and times from still-image files from among the files corresponding to the file information determined to be included in the file list in step S2002. Most image files captured by digital still cameras have respective imaging date and times embedded therein in accordance with a file format standardized as the exchangeable image file format (Exif). In step S2003, the imaging date and times embedded in accordance with the Exif standard are read and stored in the internal data. Alternatively, the imaging date and times may be obtained in accordance with an extensible metadata platform (XMP) standard or a data format defined for each vender, instead of the Exif standard. In a case where an imaging date and time is not embedded in a file, the imaging date and time may be obtained based on a time stamp which is managed by the OS and which is added to the file. Furthermore, the imaging date and times obtained as described above are added to the file list as the file information.

FIG. 3 is a diagram illustrating an example of the file information included in the file list generated in step S2002. In the list illustrated in FIG. 3, one file is managed in one row, and file information for one file is denoted by a date row 3001 and so on. Each data row includes a file name obtained in step S2002 and an imaging date and time if the imaging date and time is obtained in step S2003. For example, the data row 3001 includes a file name of IMG000.jpg and an imaging date and time of 11:23:40 Sep. 1, 2017. The list illustrated in FIG. 3 includes 10 data rows from the data row 3001 to a data row 3010. In step S2003, only the imaging date and times of the still-image files are obtained, and therefore, imaging date and times in the data rows 3003 and 3007 indicating moving images are not described. Note that imaging date and times of images extracted from moving files are generated in accordance with the imaging date and times of the moving images in step S2004 described below, and therefore, the imaging date and times of the moving image files may be obtained in step S2003.

In step S2004, the CPU 1011 extracts frames, as images, in the moving images in the moving image files in the files corresponding to the file information listed in step S2002 and step S2003. Furthermore, the CPU 1011 generates imaging date and times of the images extracted as described above and stores the images and the still-image files including the imaging date and times in step S2004.

The process in step S2004 will be described in detail with reference to FIG. 2B. In step S2101, the CPU 1011 determines whether a moving file is included in the file list generated in step S2002. This determination is performed by comparing the extensions of the file names included in the file list with a predetermined extension indicating a moving-image file. When the determination is negative in step S2101, the process in FIG. 2B is terminated.

On the other hand, when the determination is affirmative in step S2101, a process in step S2102 is executed. In step S2102, the CPU 1011 extracts a plurality of frames (still images) from one of unprocessed moving-image files which is in an uppermost portion of the file list. Various methods may be employed to extract frames from a moving image. For example, frames may be extracted in a certain predetermined interval in a moving-image reproducing time. Alternatively, correlation between a plurality of images of candidates of the extraction from a moving image may be obtained, and if the images have high correlation, one of the images is excepted from an extraction target since the images which have high correlation are similar images. In this way, the number of images to be extracted may be reduced.

In step S2103, the CPU 1011 obtains an imaging date and time of the moving image from which the frames (the still images) are extracted in step S2102. The imaging date and time of the moving image may be obtained from metadata of the moving image file. Specifically, the album creation application obtains the imaging date and time of the moving image file from the OS. The imaging date and time is a date and time when shooting of the moving image in the moving image file is started.

In step S2104, the CPU 1011 determines the imaging date and times of the extracted still images in accordance with the imaging date and time of the moving image obtained in step S2103 and reproducing times of the extracted frames (the extracted still images) in the moving image. For example, if the imaging date and time: (the imaging start date and time) recorded in the moving image is 11:23:45 Sep. 1, 2017 and a leading frame of the moving image is extracted, a reproducing time is 0 seconds. An imaging date and time of a still image corresponding to the frame is 11:23:45 Sep. 1, 2017. If a reproducing time of another frame is 2 seconds, an imaging date and time of a still image corresponding to the frame is 11:23:47 Sep. 1, 2017.

In step S2105, the CPU 1011 assigns imaging date and times individually determined in step S2104 to the plurality of frames (the still images) extracted from the moving image in step S2102. Specifically, the CPU 1011 generates a plurality of still image files which correspond to the plurality of frames and which include image data corresponding to the plurality of frames and the imaging date and times determined in step S2104. Furthermore, the CPU 1011 stores the plurality of generated still image files in the RAM 1010 or the storage device 1008.

In step S2106, the CPU 1011 adds file information of the plurality of still-image files generated in step S2105 in the file list. As described above, the plurality of still images may be extracted from the moving image of one moving-image file and stored, and therefore, a number of data rows corresponding to the number of extracted frames are added to the file list. Furthermore, in step S2106, the CPU 1011 deletes a data row corresponding to the moving image file from which the frames are extracted from the file list.

Furthermore, in step S2106, when adding the file information of the still image files of the frames extracted from the moving image file, the CPU 1011 adds a moving-image ID in addition to file names and imaging date and times to the file list. The moving-image ID is identification information for specifying a moving image which is a source of the extraction of the images (frames) included in the still image files. Therefore, the same moving-image ID is assigned to the plurality of frames extracted in step S2102 from the moving image included in one moving-image file.

Note that the moving-image ID at least uniquely specifies a moving image of an extraction source. Therefore, an ID may be incremented for each moving image, for example. For example, "ID: 0001" is assigned to still-image files extracted from the moving image in the data row 3003 and "ID: 0002" is assigned to still-image files extracted from the moving image in the data row 3007. Specifically, these IDs are added as the file information to the file list.

In step S2107, the CPU 1011 determines whether the file list includes an unprocessed moving-image file which has not been subjected to the process from step S2102 to step S2106. For example, the CPU 1011 determines, in a case where the process from step S2102 to step S2106 is executed from a moving-image file in a top of the file list, for example, whether a moving-image file in a lower level relative to a moving-image file of a processing target is included in the file list. When the determination is affirmative (Yes in step S2107), the process from step S2102 to step S2106 is executed again on the moving image file. On the other hand, when the determination is negative in step S2107, the process illustrated in FIG. 2B is terminated.

FIG. 4 is a diagram illustrating the file list which is the internal data obtained after the process of extracting images from a moving image (FIG. 2B) in step S2004 is performed. Since the data rows 3003 and 3007 are the moving-image files in FIG. 3, the data rows 3003 and 3007 are deleted from the internal data in FIG. 4. Furthermore, four still images are extracted from the moving image in the data row 3003, and data rows 4031 to 4034 are added. Similarly, two still images are extracted from the moving image in the data row 3007, and data rows 4071 and 4072 are added. As illustrated in FIG. 4, file names, imaging date and times, and moving-image IDs are assigned as file information to the still image files generated in the process performed in step S2105.

Note that a method for assigning a moving-image ID is not limited to the example described above. For example, a globally unique identifier (GUID) may be generated and assigned as a moving-image ID. Alternatively, a hush value generated from a moving-image file using the Message Digest Algorithm 5 (MD5) may be used to generate a unique ID. Furthermore, instead of generation of an ID, if an ID of photographic equipment or a management ID obtained at a time of image capturing is embedded in a moving image as imaging information, the ID may be used as the moving-image ID. Furthermore, an imaging date and time barely matches another imaging date and time on the second time scale, and therefore, an imaging date and time of a moving image may be used as an ID. Specifically, identification information which may discriminates a plurality of images extracted from a first moving image from a plurality of images extracted from a second moving image is determined.

Furthermore, as another method for assigning an ID to still-image files, still-image files may be managed by assigning IDs as file names of the still-image files of frames extracted from a moving image. Furthermore, instead of the generation of a specific ID or use of a value which is substitute of an existing ID, images extracted from the same moving image may be managed as a data structure, such as a list, in the internal data. Alternatively, directories unique to images may be generated and extracted still images may be stored in the respective directories so that still-image files are managed.

After the process in step S2004 in FIG. 2A (the process illustrated in FIG. 2B) is executed, the process in step S2005 in FIG. 2A is executed. In step S2005, the CPU 1011 executes ascending sorting on the internal data (the file list) illustrated in FIG. 4 based on the imaging date and times. FIG. 5 is a diagram illustrating the internal data (the file list) after the sorting.

When the plurality of still images including the file information in the file list are displayed in the sorted order, a still image may be sandwiched between two still images extracted from the same moving image depending on an imaging timing of the moving image. This may happen in a case where a moving image and still images captured by a digital still camera capable of recording still images while a moving image is captured are processed or a case where a folder including moving images captured by a plurality of digital still cameras is selected in step S2001, for example.

If the plurality of images are displayed in order based on the list illustrated in FIG. 5, an image captured as a still image corresponding to the data row 3004 is displayed between two images corresponding to the data rows 4031 and 4032 extracted from the same moving image. Furthermore, in a case where imaging periods of first and second moving images overlap with each other, a still image extracted from the second moving image may be displayed between the two still images extracted from the first moving image.

In this way, if a third still image is mixed between first and second still images extracted from the same moving image, a result of display is not desired by the user particularly in a case where the moving image and the third still image indicate different shooting scenes. In a case where such a display state is entered in a screen for selecting images to be arranged in an album, for example, it may be difficult for the user to select a desired image. Accordingly, in this embodiment, the information processing apparatus performs a process from step S2005 to step S2012 of FIG. 2A as display control to prevent a third still image from being displayed between first and second images extracted from the same moving image.

In step S2006, the CPU 1011 makes an access to file information of an unprocessed data row from a top of the internal data (the file list) so as to obtain the file information. When the process in step S2006 is performed on the internal data (the file list) illustrated in FIG. 5 for the first time, the file information corresponding to the data row 3001 is obtained.

In step S2007, the CPU 1011 determines whether a still-image file corresponding to the file information obtained in step S2006 is an image extracted from a moving image. In the determination process in step S2007, a type of a still-image file to be determined is identified by determining whether the file information obtained in step S2006 includes a moving-image ID, for example. Specifically, an ID is assigned to a still-image file extracted from a moving image in step S2004, and therefore, a determination as to whether the still-image file has been extracted from a moving image may be made by determining whether an ID has been assigned. As another determination method, the determination may be made by adding a flag representing whether an image has been extracted from a moving image to the internal data (the file list) in step S2004.

When the determination is affirmative in step S2007, the process proceeds to step S2008. On the other hand, when the determination is negative, the process proceeds to step S2011.

In step S2011, the CPU 1011 reads a still image from a still-image file corresponding to the file information obtained in step S2006 based on a file name included in the file information and displays the still image in the monitor 1006. In a case where a plurality of images are arranged and displayed in the monitor 1006, the CPU 1011 specifies a next display position after a last image which has been displayed in arrangement order of the images in the monitor 1006. Then the CPU 1011 displays the read image in the specified display position. In a case where the file information includes a file path, a still image is read based on the file path.

In step S2012, the CPU 1011 determines whether unprocessed data row remains in the internal data (the file list). When the determination is affirmative, the process returns to step S2006, and otherwise, the process in FIG. 2A is terminated.

For example, when the process in step S2006 is executed on the file list illustrated in FIG. 5 for the first time, the image corresponding to the data row 3001 is displayed in step S2011. Thereafter, when the process returns to step S2006, file information of an unprocessed data row is sequentially obtained from the top of the file list in step S2006, and therefore, file information in the data row 3002 is obtained. When the image display in step S2011 is performed on the data row 3002, the process returns to step S2006 again. Then the file information of a data row 4031 is obtained, and furthermore, since the file information includes a moving-image ID, the process in step S2008 is executed.

In step S2008, the CPU 1011 obtains at least one file information (file information B) including a moving-image ID included in the file information (file information A) obtained in step S2006. For example, the CPU 1011 analyzes a moving-image ID in the file information from the data row of the file information A obtained in step S2006 downward in the file list. Thereafter, a data row having the moving-image ID included in the file information A obtained in step S2006 is retrieved so that the file information B of the retrieved data row is obtained. Furthermore, as another process in step S2008, when the CPU 1011 extracts images from a moving image in step S2004, a list of the images extracted from the same moving image may be stored in the RAM 1010 separately from the file list. Then, in step S2008, the CPU 1011 may retrieve and obtain a data row having the moving-image ID included in the file information A obtained in step S2006 with reference to the list.

It is assumed, in the example illustrated in FIG. 5, that file information of a data row 4031 has been obtained in step S2006. In this case, file information in the data rows 4032 to 4034 including the moving-image ID "0001" which is the same as the moving-image ID of the data row 4031 is obtained by the process in step S2008.

In step S2009, the CPU 1011 reads information corresponding to the file information A and at least one image corresponding to the at least one file information B based on the file information A obtained in step S2006 and the at least one file information B obtained in step S2008. Then the CPU 1011 displays a plurality of images obtained as described above in the monitor 1006. A display method is the same as that employed in step S2011 described above. In a case where a plurality of images are arranged and displayed in the monitor 1006, for example, the CPU 1011 specifies a plurality of display positions of images following a last image which has been displayed in arrangement order of the images in the monitor 1006 in step S2009. Then the CPU 1011 displays the plurality of read images in the plurality of specified display positions. Furthermore, the CPU 1011 determines order of arrangement of the plurality of images read in step S2009 in accordance with order in the file list. Note that, as with the process in step S2011, when a file path is included in the file information, a still image may be read based on the file path in step S2009.

According to the process from step S2006 to step S2009, when the file information of the data row 4031 is obtained in step S2006, for example, the file information of the data rows 4032 to 4034 is obtained in step S2008. In step S2009, images are read from four still-image files having file names "MOV001_1.jpg", "MOV001_2.jpg", "MOV001_3.jpg", and "MOV001_4.jpg". Then the read four images are displayed in order of imaging date and times in the monitor 1006.

In step S2010, the CPU 1011 deletes file information corresponding to the still-image files which are displayed in step S2009 from the internal data (the file list). The deletion process in step S2010 is performed to avoid a situation in which an image displayed once is displayed again in an overlapping manner since the internal data (the file list) is accessed from the top in step S2006. The data rows may be actually deleted in step S2010 or a flag provided for indicating that display has been performed may be set in step S2010. The overlapping image display may be avoided by referring to the flag in step S2006.

The process in step S2010 is executed on the file list illustrated in FIG. 5. The internal data (the file list) after the data rows are deleted is illustrated in FIG. 6. The file list illustrated in FIG. 6 is obtained by deleting the data rows in which the file information is obtained in step S2008 from the file list illustrated in FIG. 5.

The process from step S2006 to step S2011 is repeatedly performed on the file list illustrated in FIG. 6 until it is determined that unprocessed data is not included in step S2012. Specifically, reading and display of an image (S2011) is successively performed based on the file information of the data rows 3004, 3005, 3006, and 3008. Thereafter, the image reading and the image display (S2009) are performed on file information of the data rows 4071 and 4072, and the image reading and the image display (S2011) are performed based on the file information of the data rows 3009 and 3010. Note that, in a case where different images having different numbers of pixels are included in a still-image file, one of the images having a smallest number of pixels (a thumbnail image, for example) may be displayed in step S2009 and step S2011.

Figure 7:
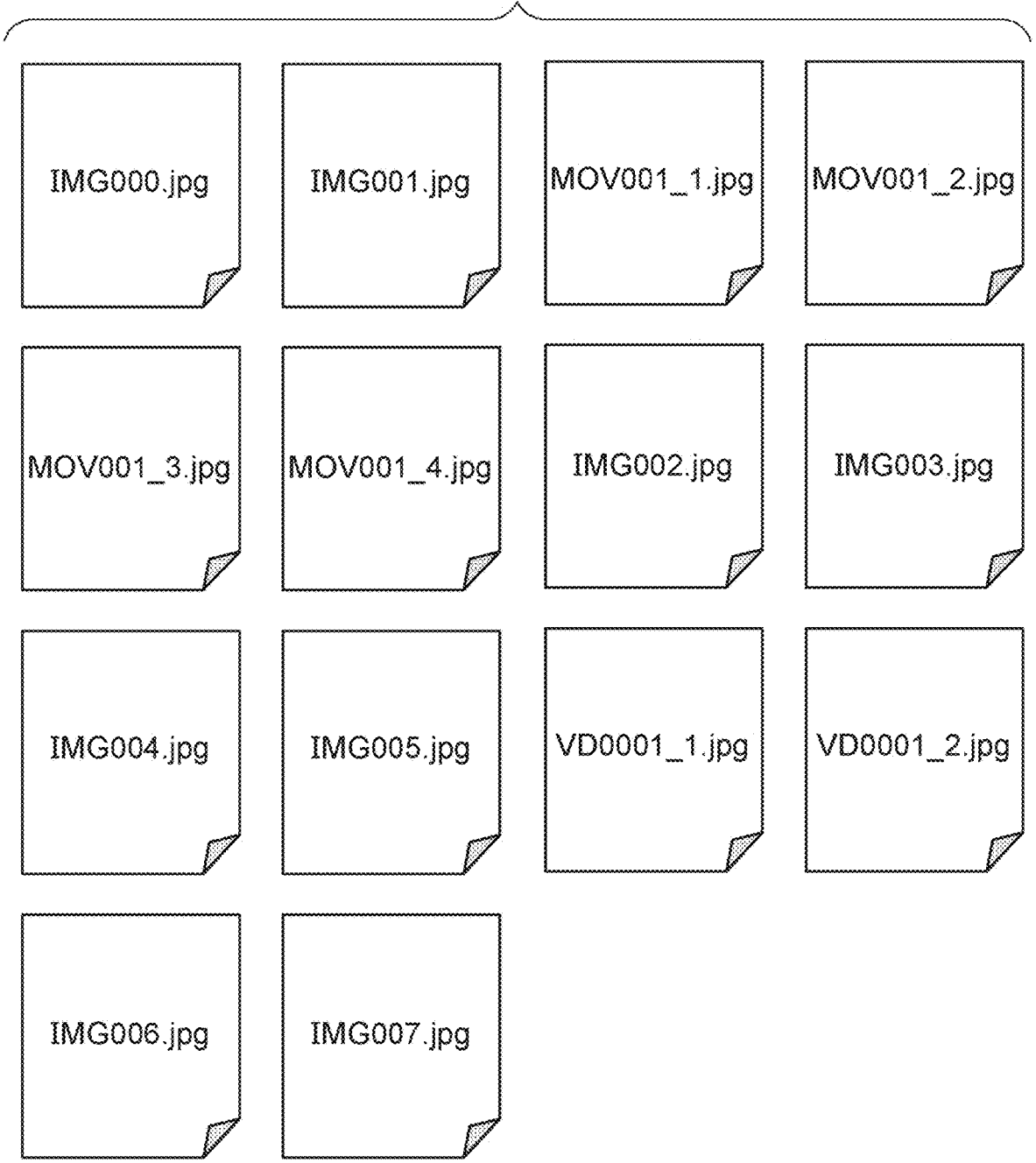
FIG. 7 is a diagram illustrating an example of a display result.

An example of a result of display in a case where the process in FIGS. 2A and 2B is executed based on the internal data (the file list) illustrated in FIG. 4 is illustrated in FIG. 7. FIG. 7 is a diagram illustrating an example of display in a case where the plurality of images are arranged from an upper left portion to a lower right portion in the monitor 1006. Note that, although the images are indicated by the file names for simplicity of description in FIG. 7, content of the images, such as photographs, are displayed in practice.

Alternatively, the file names illustrated in FIG. 7 may be displayed on outsides or insides of the images, such as photographs.

In the internal data (the file list) in which the file information is sorted in chronological order in accordance with the imaging date and times as illustrated in FIG. 5, a third still image is mixed between first and second still images extracted from a moving image. However, in the display result illustrated in FIG. 7, a plurality of still images extracted from the same moving image are collectively displayed for each moving image in arrangement order of the images. For example, the four images having the file names "MOV001_1.jpg" to "MOV001_4.jpg" are collectively displayed and two images having file names "VD0001_1.jpg" and "VD0001_2.jpg" are collectively displayed.

By the process described above, mixture of the third still image between the first and second images extracted from the same moving image caused when the images extracted from the moving image and the still image captured as a still image are mixed and arranged in chronological order may be avoided. It is highly likely that the plurality of still images extracted from the same moving image are captured in a series of consecutive shooting scenes. Therefore, when the plurality of still images extracted from the same moving image are collectively displayed as illustrated in FIG. 7, visibility of the images for the user or usability of image selection are improved.

Furthermore, according to the process illustrated in FIGS. 2A and 2B, IDs are assigned to the individual moving images, and therefore, a plurality of still images extracted from a plurality of moving images are not mixed and are collectively displayed for individual moving images even if shooting periods of the plurality of moving images overlap with each other. Therefore, the visibility of images for the user and the usability of image selection are improved.

Furthermore, according to the process in FIGS. 2A and 2B, an image captured as a still image and images extracted from a moving image are displayed in accordance with imaging date and times. For example, in FIG. 7, the files having the file names "MOV001_1.jpg" to "MOV001_4.jpg" are displayed between images having file names "IMG001.jpg" and "IMG002.jpg". Therefore, the user may view and select an image after recognizing the imaging date and time of the moving image and the imaging date and times of the still images. Therefore, the visibility of images and the usability of image selection are improved when compared with the method for finally displaying images extracted from a moving image, for example, in arrangement order in a collective manner separately from images captured as still images (the method for displaying the images in order illustrated in FIG. 4).

Note that, in the foregoing embodiment, the display positions of the images extracted from the moving image are determined based on an imaging date and time of a leading image extracted from the moving image. However, the present disclosure is not limited to this, and the display positions of the images extracted from the moving image may be determined based on an imaging date and time of a first one of the images extracted from the moving image if the leading image of the moving image is not extracted. Alternatively, the display positions of the images extracted from the moving image may be determined based on an imaging date and time of a last one of the images extracted from the moving image. In this case, a determination as to whether the first image is used or the last image is used may be made based on the number of extracted images and the number of still images captured in a moving-image shooting period.

Furthermore, as described above, the album creation application of this embodiment includes the album automatic creation function. The display illustrated in FIG. 7 may be a screen including images of selection candidates to be selected as an image to be exchanged by an image arranged in an album created by the album automatic creation function. Specifically, the display in FIG. 7 may be performed to select images arranged in an album as a substitute of an image automatically selected by the album automatic generation function.

In the automatic selection of an image by the album automatic creation function, the still images extracted from the moving image in step S2004 are selection candidates. Then the CPU 1011 automatically arranges the still images in order of the imaging date and times in a plurality of double-page spreads or a double-page spread. Therefore, the CPU 1011 may automatically arrange the images with reference to the imaging date and times in the file list (FIG. 5) sorted in step S2005. The process in step S2006 in FIG. 2A onwards may be executed when the user instructs exchange of images after the album is automatically generated and is displayed, and images of candidates to be newly arranged may be displayed as illustrated in FIG. 7.

Specifically, if the album is created by t album automatic generation function, still images extracted from a moving image may be arranged and displayed in positions corresponding to actual imaging date and times of the images extracted from the moving image. In this case, if two images are extracted from the same moving image, another image may be arranged and displayed between the two images. However, in the album, images extracted from the moving image may be arranged and displayed in true arrangement positions corresponding to the actual imaging date and times of the images. When images are to be exchanged, a plurality of images extracted from a moving image are collectively displayed as illustrated in FIG. 7, and therefore, visibility of an image and usability of image selection are improved.

Note that time information of the images extracted from the moving image to be used when the images are automatically arranged by the album automatic creation function may be determined in step S2104 or determined another timing.

The album creation application may have a function of manually selecting images to be arranged by the user instead of the album automatic creation function, and the screen illustrated in FIG. 7 may be displayed as a screen including images of selection candidates for the manual selection.

Second Embodiment

Figure 8A:
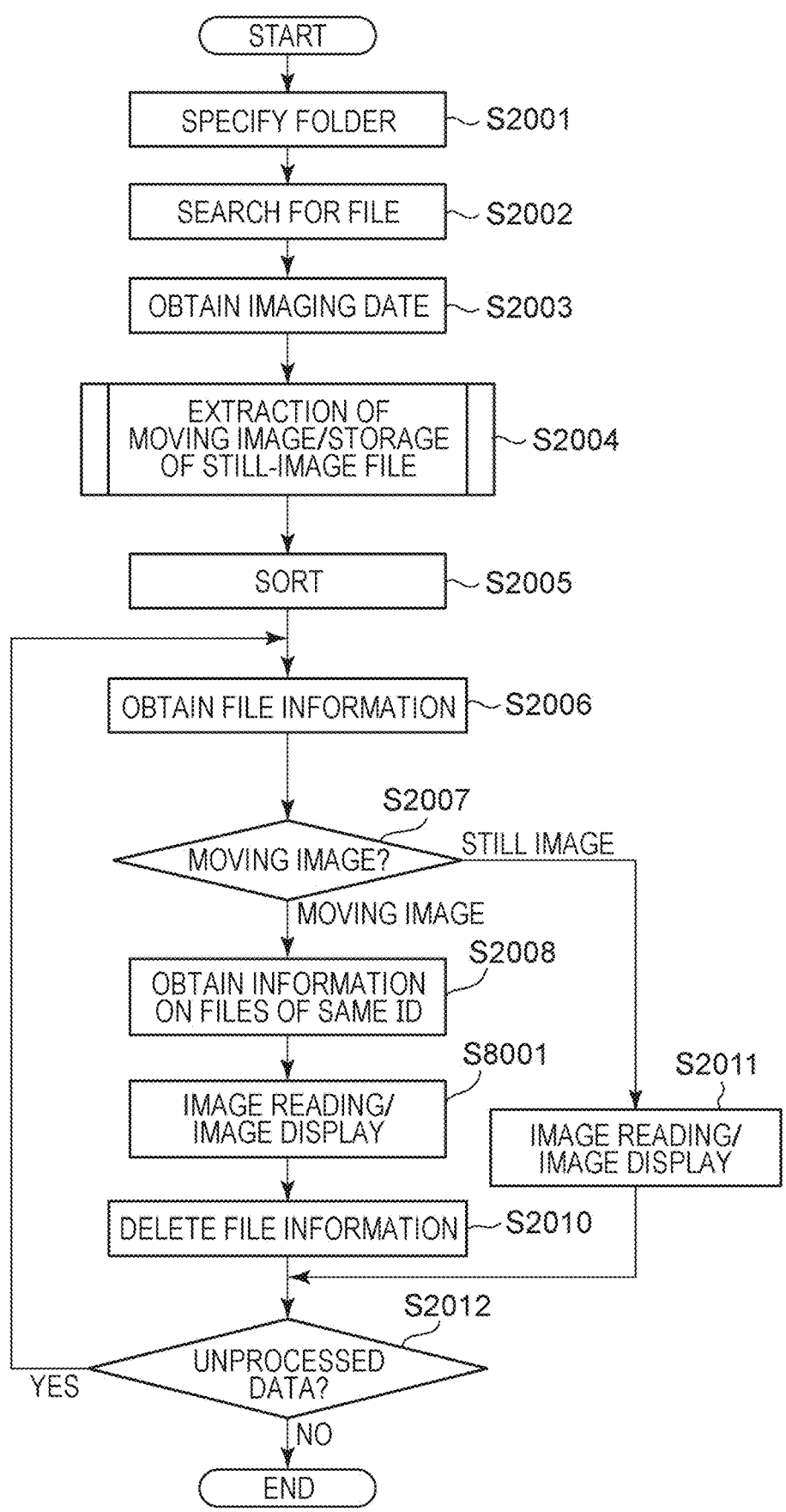
FIGS. 8A and 8B are flowcharts of another example of a display control process performed by an information processing apparatus.
Figure 8B:
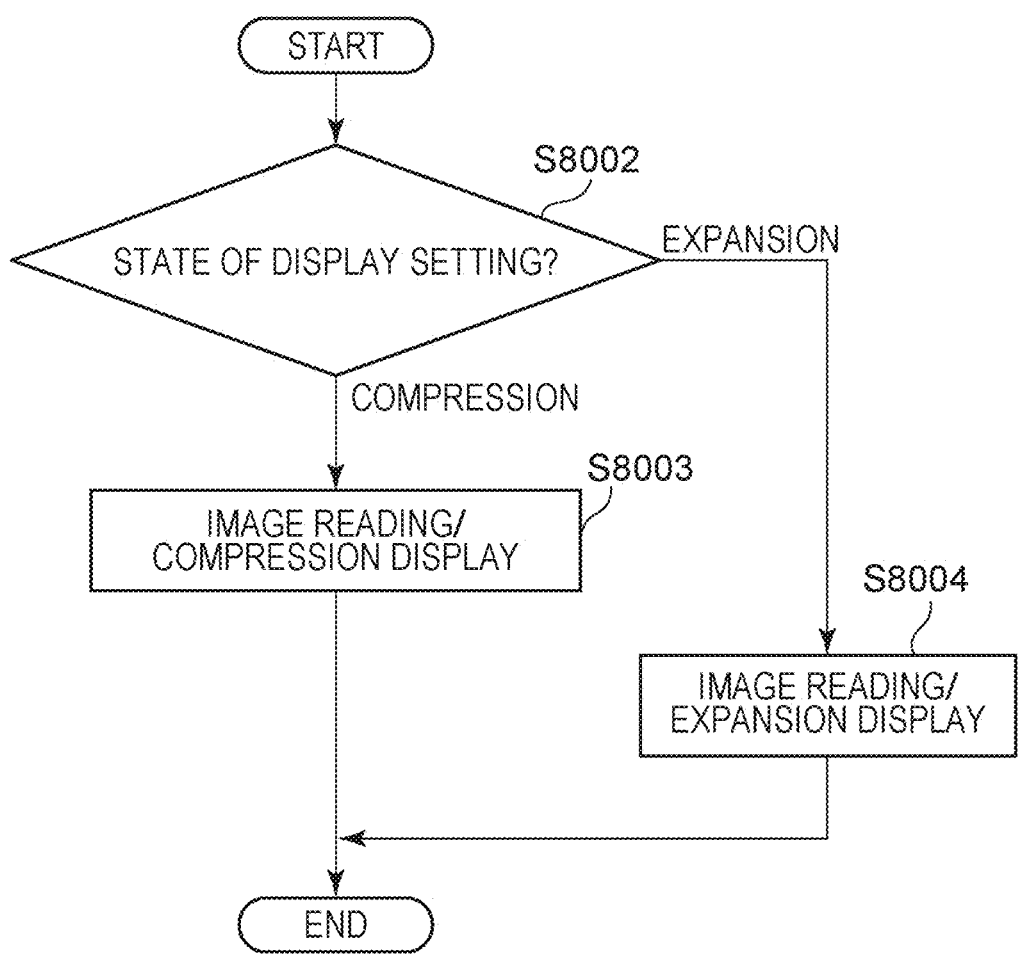

Although images extracted from a moving image are collectively displayed in the display example illustrated in FIG. 7, the same effect may be obtained when only one of the plurality of images extracted from the moving image is displayed and the remaining images are displayed as a list where appropriate. The display will be described with reference to FIGS. 8A and 8B. FIGS. 8A and 8B are flowcharts of an example of a display control process performed by an information processing apparatus.

FIG. 8A is different from FIG. 2A in display control performed in step S8001 in a case where a still-image file corresponding to file information obtained in step S2006 is determined as a file of an image extracted from a moving image.

FIG. 8B is a flowchart of a process in step S8001 illustrated in detail. In step S8002, a CPU 1011 performs switch between a display process (compression display) in step S8003 and a display process (expansion display) in step S8004 in accordance with a state of a display setting associated with a method for displaying images extracted from a moving image. For example, in a default display setting of an album creation application, a setting corresponding to step S8003 is performed.

In step S8003, the CPU 1011 reads an image of a file corresponding to file information obtained in step S2006 and displays the image such that the image is distinguishable from other still images. Furthermore, in step S8003, the CPU 1011 does not read an image of a file corresponding to file information obtained in step S2008 or does not display the image.

Figure 9:
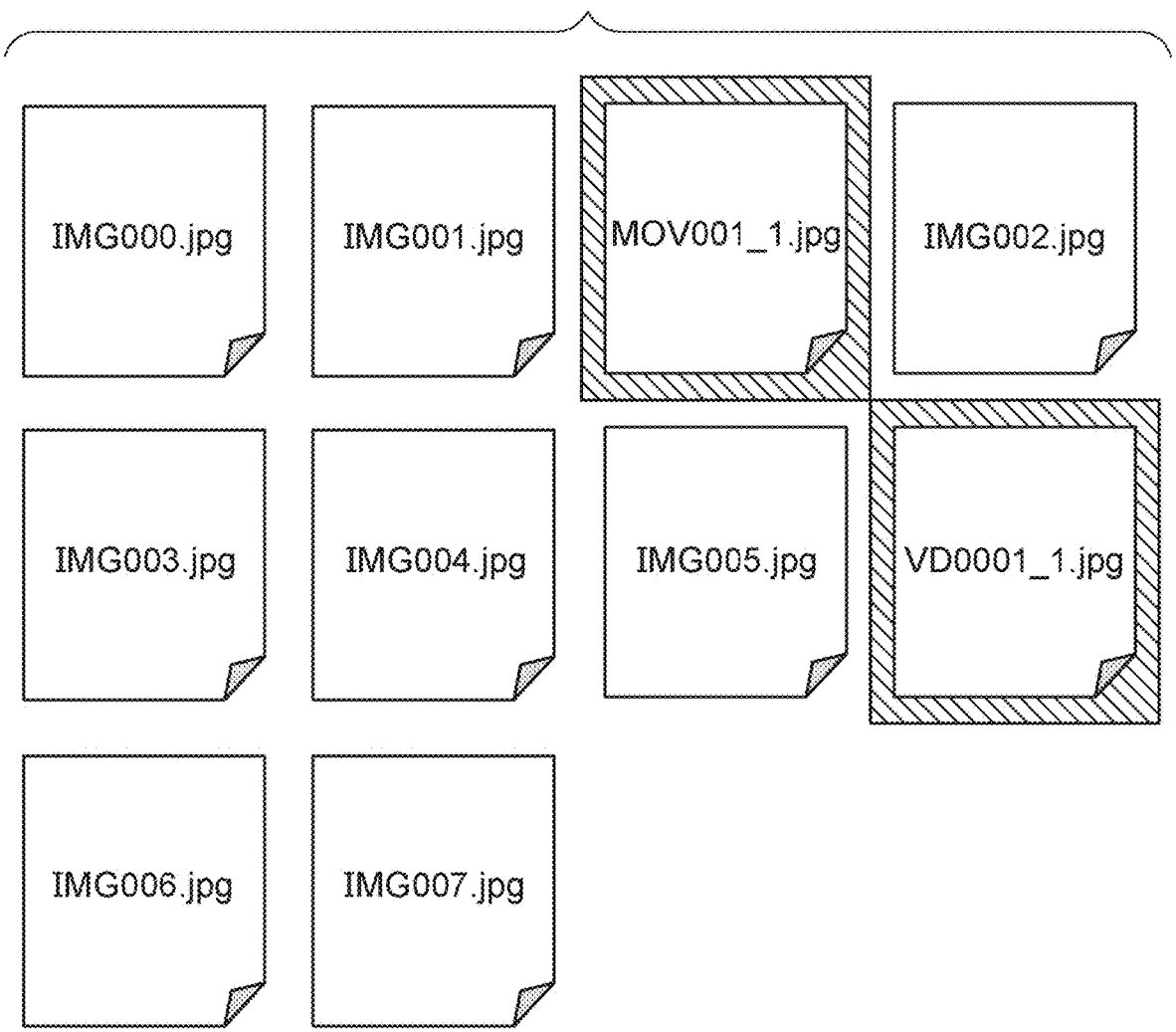
FIG. 9 is a diagram illustrating an example of a result of compression display.

A result of the display by the process illustrated in FIG. 8A in a case where the compression display is performed in step S8003 is illustrated in FIG. 9 as an example. In the example of FIG. 9, images are displayed on folder-like icons so that impression as if still images are further provided is given to a user.

On the other hand, the CPU 1011 performs an expansion display process in step S8004. In this case, a process the same as that in step S2009 of FIG. 2A is executed, for example, and the display state illustrated in FIG. 7 is obtained.

Furthermore, when the compression display is performed in step S8003 and the screen illustrated in FIG. 9 is displayed, the user may select an image extracted from a moving image in the display state illustrated in FIG. 9. Then a display setting may be changed to expansion display, and images may be displayed in accordance with the flowchart of FIG. 8A again. In this case, since the expansion display is set as the display setting, the process in step S8004 is executed. In step S8004, the display process for entering a display state in FIG. 10 or FIG. 11 is executed in accordance with the moving image from which the still image selected by the user is extracted.

Figure 10:
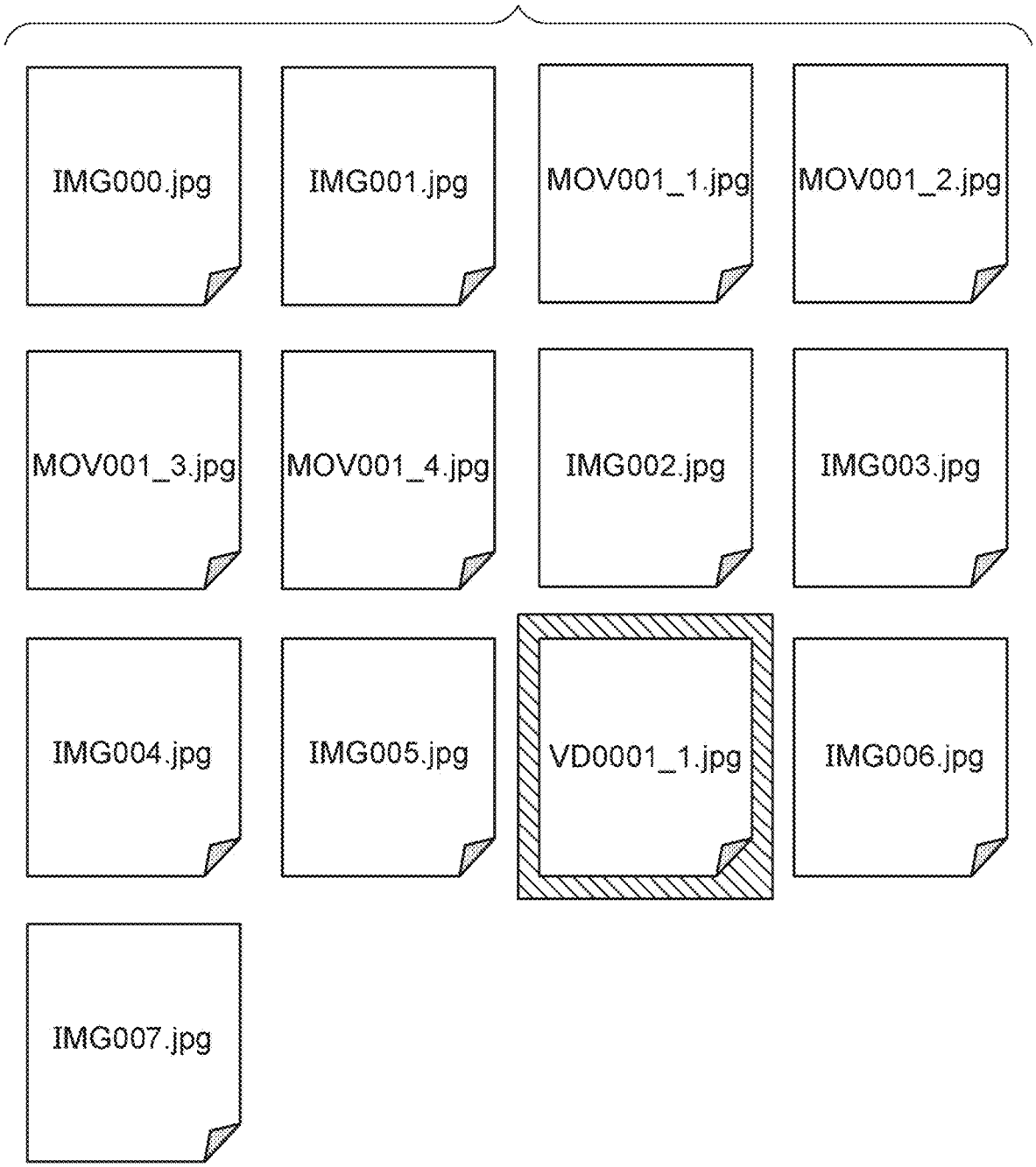
FIG. 10 is a diagram illustrating an example of a state of enlarged display.

In the screen illustrated in FIG. 9, when an image having a file name "MOV001_1.jpg" is selected by the user through an input device 1007, the display state illustrated in FIG. 9 is changed to the display state of the expansion display illustrated in FIG. 10. In FIG. 10, when compared with the display result of FIG. 9, the remaining still images extracted from the moving image from which the image of the file name "MOV001_1.jpg" is extracted are additionally displayed. Specifically, still images having file names "MOV001_2.jpg" to "MOV001_4.jpg" are additionally displayed. Furthermore, when an image having a file name "VD0001_1.jpg" is selected by the user through the input device 1007, the display state illustrated in FIG. 10 is changed to the display state illustrated in FIG. 7. Note that the selection performed by the user through the input device 1007 is made by a click using a mouse or a touch on a touch panel, for example.

Figure 11:
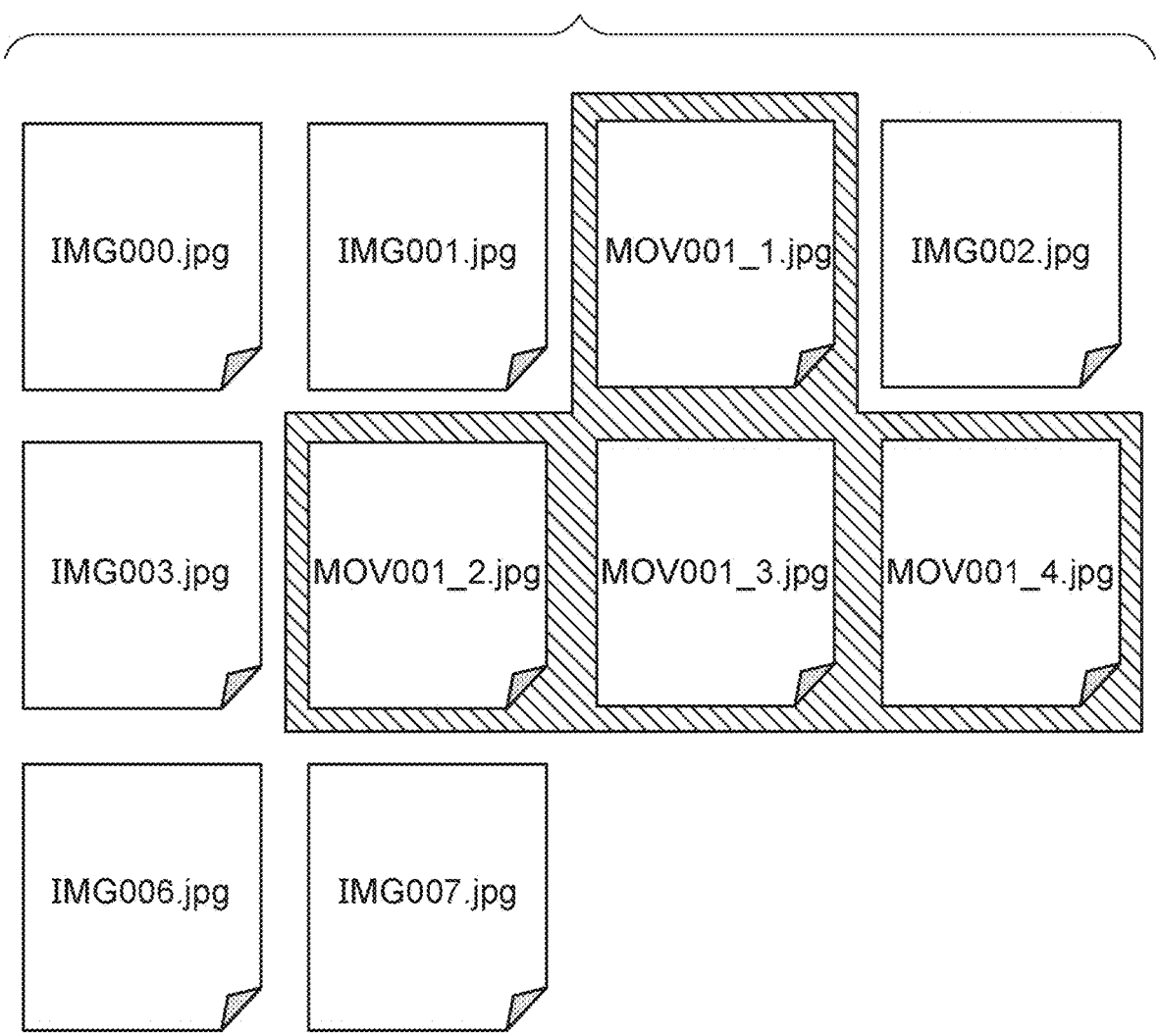
FIG. 11 is a diagram illustrating another example of a state of enlarged display.

FIG. 11 is a diagram illustrating another example of the display state of the expansion display in a case where the image having the file name "MOV001_1.jpg" is selected in the display state illustrated in FIG. 9. In FIG. 11, the remaining still images extracted from the moving image from which the image having the file name "MOV001_1.jpg" is extracted are arranged instead of some of the images included in FIG. 9 and are additionally displayed so as to be distinguishable from other still images. In FIG. 11, the display is performed as if a folder including the image having the file name "MOV001_1.jpg" is opened so that the images in the folder are developed. Therefore, the fact that the remaining images extracted from the moving image have been developed is easily recognized by the user. Furthermore, in the example of FIG. 11, the other still images which have not been selected by the user and which are included in the display in FIG. 9 are not displayed or displayed while display positions are not changed. Therefore, the plurality of images extracted from the moving image from which the image selected by the user is extracted attract attention of the user so that the user may easily select a desired image from among the plurality of images.

Furthermore, if a predetermined display region other than the still images extracted from the moving image is clicked or touched while the expansion display is performed as illustrated in FIGS. 7, 10, and 11, the display setting may be changed to the compression display and the flowchart in FIGS. 8A and 8B may be executed again. In this case, the display state illustrated in FIG. 9 is entered.

As described above, when the compression display is performed, only a first one of the images extracted from the moving image is displayed as illustrated in FIG. 9, and the other extracted images are hid. Furthermore, when the expansion display is performed by a user operation, the remaining still images extracted from the moving image may be displayed as a list as illustrated in FIGS. 7, 10, and 11.

According to the process of FIGS. 8A and 8B, when images extracted from a moving image and images captured as still images are arranged and displayed in chronological order, only a first one of the images extracted from the moving image is displayed. Then the user may display the remaining images extracted from the same moving image where appropriate. The plurality of images extracted from the same moving image are consecutively displayed (FIG. 10) or are displayed in an emphasized manner so as to be distinguishable from the other still images (FIG. 11). Therefore, the user may easily select the remaining images extracted from the desired moving image.

Third Embodiment

Although an imaging date and time is used as time information associated with a still-image file in the foregoing embodiments, the present disclosure is not limited to this. For example, a date and time when a still-image file is updated, a date and time when a still-image file is created, or the like may be used as the time information. In this case, an update date and time and a creation date and time of a still-image file of an image extracted from a moving image are determined in accordance with an update date and time and a creation date and time, respectively, of the moving image and a reproduction time of the still-image file.

Furthermore, in the foregoing embodiments, a plurality of images are arranged and displayed in a monitor in accordance with the time information. However, the present disclosure is not limited to this and is applicable to a case where a plurality of images are displayed in a monitor in a temporally consecutive manner in display order based on time information, such as a case of slide show. Even in this case, according to the foregoing embodiments, a situation in which a third image is displayed between first and second images extracted from the same moving image may be avoided in temporal display order of the plurality of images.

Note that the functions of the embodiments may be realized by the following configuration. Specifically, the functions are achieved when program codes for performing the processes of the embodiments are supplied to a system or an apparatus, and a computer (or a CPU or an MPU) of the system or the apparatus executes the program codes. In this case, the program codes read from a storage medium realize the functions of the foregoing embodiments, and the storage medium storing the program codes also realize the functions of the embodiments.

Furthermore, the program codes for realizing the functions of the embodiments may be executed by a single computer (a CPU or an MPU) or by a plurality of computers operated in combination. Furthermore, the program codes may be executed by the computer, or hardware, such as circuits, for realizing the functions of the program codes may be provided. Alternatively, a number of the program codes may be realized by hardware and the others may be executed by the computer.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Biu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2017-193785 filed Oct. 3, 2017, which is hereby incorporated by reference herein in its entirety.

What is claimed is:
1. An information processing method comprising:
extracting a plurality of frames included in a moving image, as a plurality of first images;
assigning, to the plurality of first images extracted from the moving image, a plurality of first dates and times which are based on time information corresponding to the moving image;
sorting the plurality of first images and a second image captured as a still image, in accordance with the plurality of the first dates and times and a second date and time corresponding to the second image;
executing a first display for displaying images included in the plurality of first images and the second image, in accordance with first order obtained by the sorting;
executing a second display for displaying the plurality of first images and the second image, such that the plurality of first images and the second image are arranged in second order based on the time information corresponding to the moving image and the second date and time corresponding to the second image; and
changing a display target image of the first display, from an image which has been displayed in the executing of the first display, to another image selected by a user from the plurality of first images and the second image which are displayed by the second display,
wherein, in a case where the second date and time is between two of the first dates and times and the second image is between two of the first images in the first order obtained by the sorting, (a) the two of the first images and the second image are displayed by the first display, such that the second image is displayed between the two of the first images in the first order obtained by the sorting and (b) the two of first images and the second image are displayed by the second display, such that the two of first images are consecutively arranged and that the two of first images and the second image are arranged in order based on the time information corresponding to the moving image and the second date and time.

2. The method according to claim 1,
wherein in a case where the plurality of first images and a plurality of third images corresponding to a plurality of frames included in another moving image which is different from the moving image are displayed in the displaying,
a plurality of third dates and times assigned to the plurality of third images in the assigning, and
wherein, in the executing the second display, the plurality of first images, the second image, and the plurality of third images are displayed such that the plurality of first images are consecutively arranged and the plurality of third images are consecutively arranged, and the plurality of first images, the second image, and the plurality of third images are arranged in the second order based on the time information corresponding to the moving image, the second date and time, and the time information corresponding to the another moving image.

3. The method according to claim 2, the information processing method further comprising:
determining identification information for discriminating the plurality of first images and the plurality of third images from each other,
wherein, in the executing of the second display, the plurality of first images and the plurality of third images are displayed such that the plurality of first images are consecutively arranged and the plurality of third images are consecutively arranged based on the determined identification information.

4. The method according to claim 3,
wherein, in the determining, different IDs are determined for the plurality of first images and the plurality of third images as the identification information and the determined IDs are assigned to the individual first images and the individual third images, and in the executing of the second display, the plurality of first images, the second image, and the plurality of third images are displayed such that the plurality of first images and the plurality of third images are distinguished from each other in accordance with the assigned IDs.

5. The method according to claim 3, the information processing method further comprising:
generating a list which includes information corresponding to the individual first images and information corresponding to the second image which are arranged in accordance with the plurality of the first dates and times and the second date and time and which includes the determined identification information,
wherein, in the executing of the second display, the plurality of first images and the plurality of third images are displayed such that the plurality of first images are consecutively arranged and the plurality of third images are consecutively arranged based on the generated list.

6. The method according to claim 1, wherein, in the assigning, a plurality of image files corresponding to the plurality of first images which include image data corresponding to the individual first images and time information of the first time corresponding to the individual first images are generated.

7. The method according to claim 1, further comprising:
creating an album in which at least a part of the plurality of first images and the second image are arranged in accordance with the first order,
wherein, in the executing of the first display, the created album is displayed.

8. The method according to claim 7, wherein the changing including:
selecting images to be arranged in an album in accordance with a user instruction associated with the second display of the plurality of first images and the second image; and
arranging the selected images in the album.

9. The method according to claim 1, wherein the executing of the first display including:
automatically selecting a plurality of images to be displayed based on a result of analysis of the plurality of first images and the second image; and
displaying the plurality of images selected by the automatically selecting in accordance with the first order,
wherein, in the changing, images to be displayed in the first display are selected in accordance with a user instruction associated with the second display, instead of images which have been automatically selected and displayed in the first display, and the selected images are displayed in the first display instead of the images which have been automatically selected.

10. The method according to claim 9, wherein, in a case where the plurality of first images and the second image are automatically selected, the individual first images and the second images are displayed in the first display in accordance with the first order according to the first time corresponding to the individual first images and the second date and time.

11. The method according to claim 1, wherein, in the second display, the individual first images and the second image are displayed such that the individual first images and the second image are arranged in a display apparatus in the second order based on the time information corresponding to the moving image and the second date and time.

12. The method according to claim 1,
wherein in the assigning, identification information for discriminating the plurality of first images from the second image, is further assigned to the plurality of first images, and
in the executing of the second display, the two of first images are consecutively arranged based on the identification information.

13. An information processing apparatus comprising:
an extracting unit configured to extract a plurality of frames included in a moving image, as a plurality of first images;
an assigning unit configured to assign, to the plurality of first images extracted from the moving image, a plurality of first dates and times which are based on time information corresponding to the moving image;
a sorting unit configured to sort the plurality of first images and a second image captured as a still image, in accordance with the plurality of the first dates and times and a second date and time corresponding to the second image;
a display controller configured to execute a first display for displaying images included in the plurality of first images and the second image, in accordance with first order obtained by the sorting;
the display controller configured to execute a second display for displaying the plurality of first images and the second image, such that the plurality of first images and the second image are arranged in second order based on the time information corresponding to the moving image and the second date and time corresponding to the second image; and
a changing unit configured to change a display target image of the first display, from an image which has been displayed in the executing of the first display, to another image selected by a user from the plurality of first images and the second image which are displayed by the second display,
wherein, in a case where the second date and time is between two of the first dates and times and the second image is between two of the first images in the first order obtained by the sorting, (a) the two of the first images and the second image are displayed by the first display, such that the second image is displayed between the two of the first images in the first order obtained by the sorting unit and (b) the two of first images and the second image are displayed by the second display, such that the two of first images are consecutively arranged in the order, and that the two of first images and the second image are arranged in order based on the time information corresponding to the moving image and the second date and time.

14. A non-transitory computer-readable storage medium storing a program comprising instructions which, when the program is executed by a computer, cause the computer to carry out an image processing method comprising:
extracting a plurality of frames included in a moving image, as a plurality of first images;
assigning, to the plurality of first images extracted from the moving image, a plurality of first dates and times which are based on time information corresponding to the moving image;
sorting the plurality of first images and a second image captured as a still image, in accordance with the plurality of the first dates and times and a second date and time corresponding to the second image;

executing a first display for displaying images included in the plurality of first images and the second image, in accordance with first order obtained by the sorting;

executing a second display for displaying the plurality of first images and the second image, such that the plurality of first images and the second image are arranged in second order based on the time information corresponding to the moving image and the second date and time corresponding to the second image; and changing a display target image of the first display, from an image which has been displayed in the executing of the first display, to another image selected by a user from the plurality of first images and the second image which are displayed by the second display, wherein, in a case where the second date and time is between two of the first dates and times and the second image is between two of the first images in the first order obtained by the sorting, (a) the tow of the first images and the second image are displayed by the first display, such that the second image is displayed between the two of the first images in the first order obtained by the sorting and (b) the two of first images and the second image are displayed by the second display, such that the two of first images are consecutively arranged and that the two of first images and the second image are arranged in order based on the time information corresponding to the moving image and the second date and time.

\* \* \* \* \*